(12) United States Patent
Fujieda et al.

(10) Patent No.: US 10,556,342 B2
(45) Date of Patent: Feb. 11, 2020

(54) TEACHING DEVICE, TEACHING METHOD, AND ROBOT SYSTEM

(71) Applicant: CANON KABUSHIKI KAISHA, Tokyo (JP)

(72) Inventors: Yasusato Fujieda, Tokyo (JP); Hisashi Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 15/548,078

(22) PCT Filed: Jan. 27, 2016

(86) PCT No.: PCT/JP2016/000415
§ 371 (c)(1),
(2) Date: Aug. 1, 2017

(87) PCT Pub. No.: WO2016/125464
PCT Pub. Date: Aug. 11, 2016

(65) Prior Publication Data
US 2018/0021952 A1      Jan. 25, 2018

(30) Foreign Application Priority Data
Feb. 3, 2015 (JP) .................................. 2015-019641

(51) Int. Cl.
*B25J 9/16*      (2006.01)
*G05B 19/4069*   (2006.01)

(52) U.S. Cl.
CPC ........ *B25J 9/1671* (2013.01); *G05B 19/4069* (2013.01); *G05B 2219/39014* (2013.01); *G05B 2219/40317* (2013.01)

(58) Field of Classification Search
CPC ...... B25J 9/1671; B25J 9/1605; B25J 9/1653; B25J 9/1664–1666; B25J 9/1674–1676; G05B 19/4069; G05B 2219/39014; G05B 2219/40317; G05B 17/00; G05B 19/19; G05B 19/401; G05B 19/4093; G05B 19/41885; G05B 2219/40314
USPC .......... 700/264, 250, 253, 255; 901/3, 9, 50; 318/568.13
See application file for complete search history.

(56) References Cited

U.S. PATENT DOCUMENTS

| | | | | |
|---|---|---|---|---|
| 2006/0025890 A1* | 2/2006 | Nagatsuka | ............. | B25J 9/1666 700/253 |
| 2011/0238215 A1* | 9/2011 | Yanagawa | ............... | G05B 19/42 700/258 |
| 2013/0123983 A1* | 5/2013 | Brogrdh | ................... | B25J 9/162 700/254 |

FOREIGN PATENT DOCUMENTS

| | | |
|---|---|---|
| JP | H02-148307 A | 6/1990 |
| JP | H03-113512 A | 5/1991 |
| JP | H05-19840 A | 1/1993 |
| JP | H05-119824 A | 5/1993 |
| JP | H10-128684 A | 5/1998 |

(Continued)

*Primary Examiner* — Bao Long T Nguyen
(74) *Attorney, Agent, or Firm* — Canon U.S.A., Inc. IP Division

(57) ABSTRACT

A teaching device constructs, in a virtual space, a virtual robot system in which a virtual 3D model of a robot and a virtual 3D model of a peripheral structure of the robot are arranged, and teaches a moving path of the robot. The teaching device includes an acquisition unit configured to acquire information about a geometric error between the virtual 3D models, and a correction unit configured to correct the moving path of the robot in accordance with the information acquired by the acquisition unit.

15 Claims, 17 Drawing Sheets

(56) References Cited

FOREIGN PATENT DOCUMENTS

| JP | 2003-150219 A | 5/2003 |
| JP | 2006-048244 A | 2/2006 |
| JP | 2009-125920 A | 6/2009 |
| JP | 2011-031309 A | 2/2011 |
| JP | 2015-009324 A | 1/2015 |

* cited by examiner

[Fig. 1]
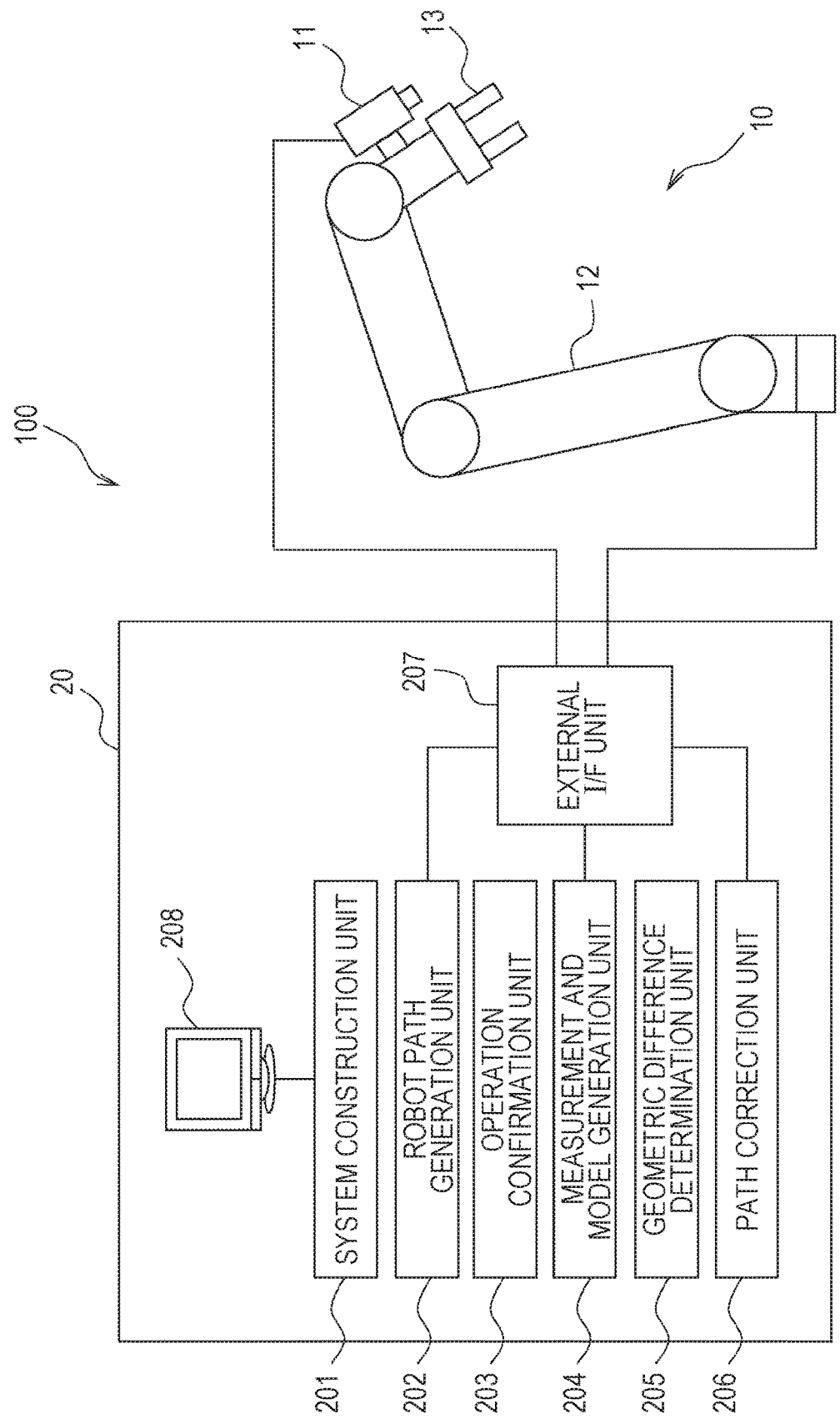

[Fig. 2]
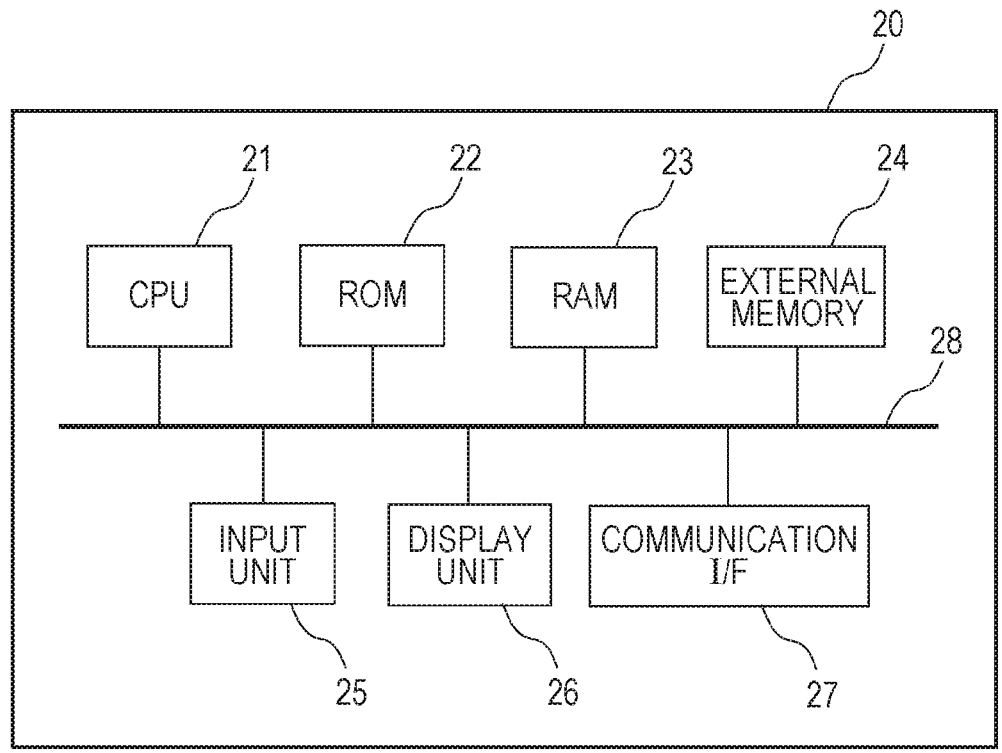
[Fig. 3]
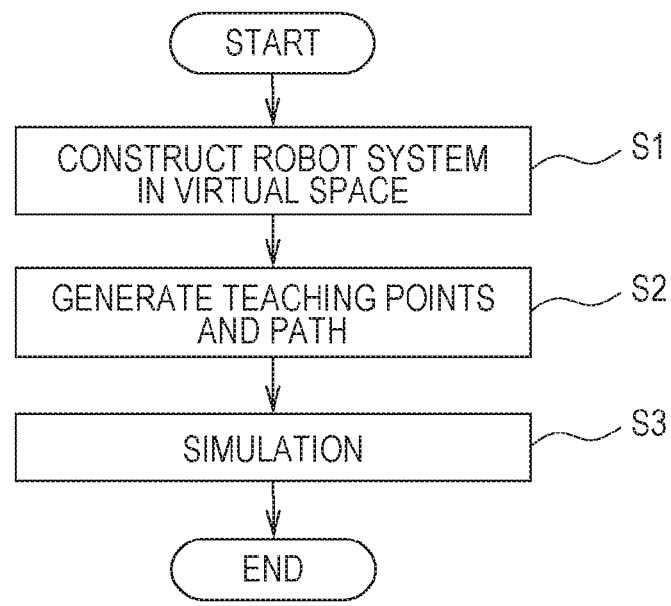

[Fig. 4]
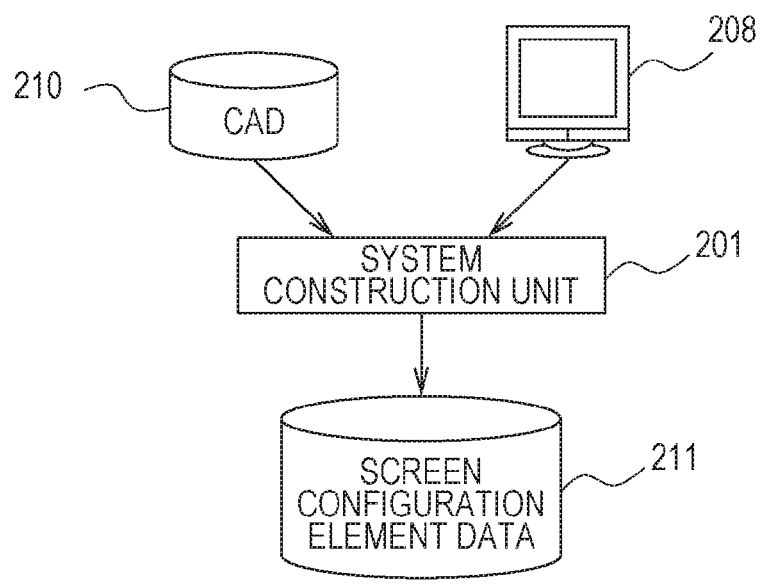
[Fig. 5]
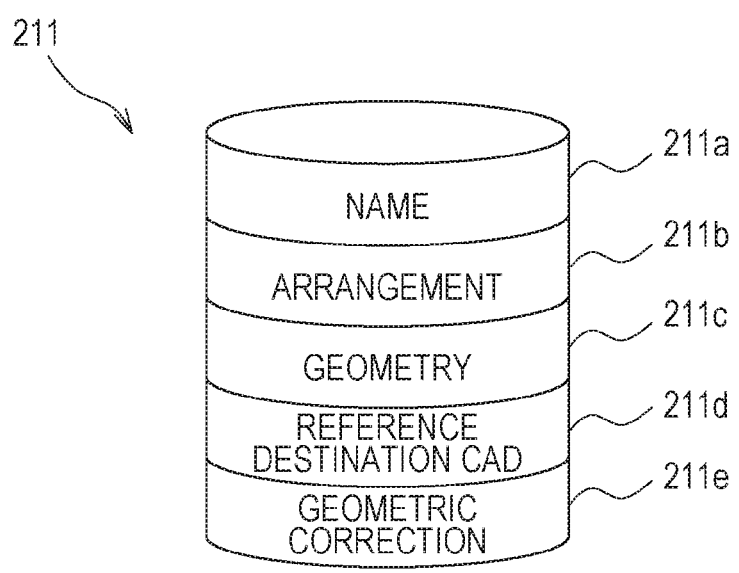

[Fig. 6]
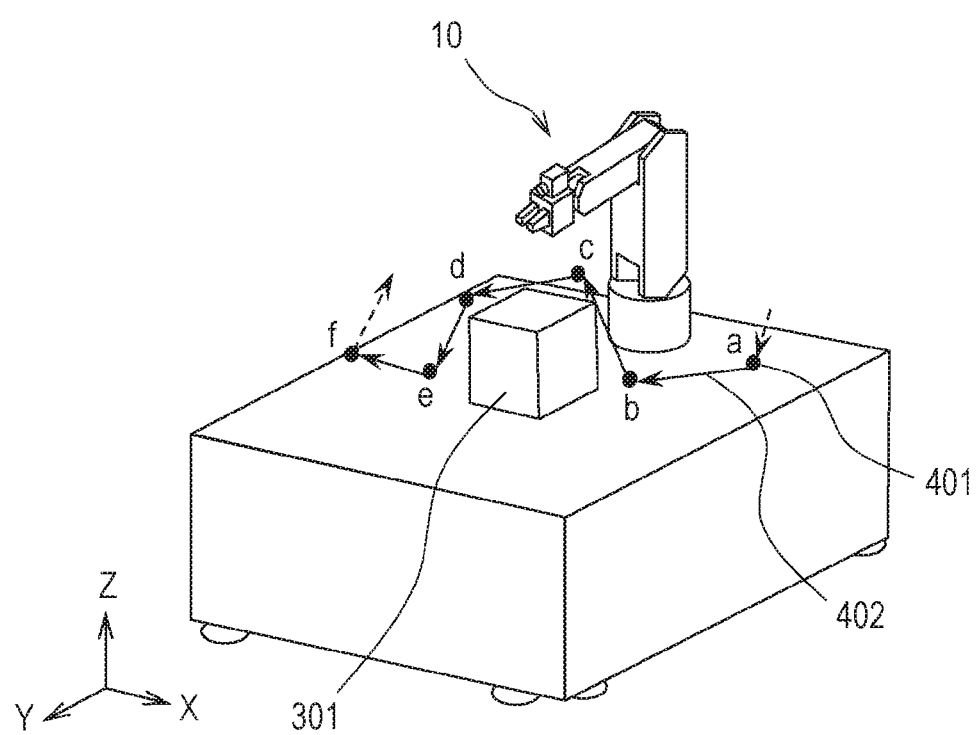

[Fig. 7]
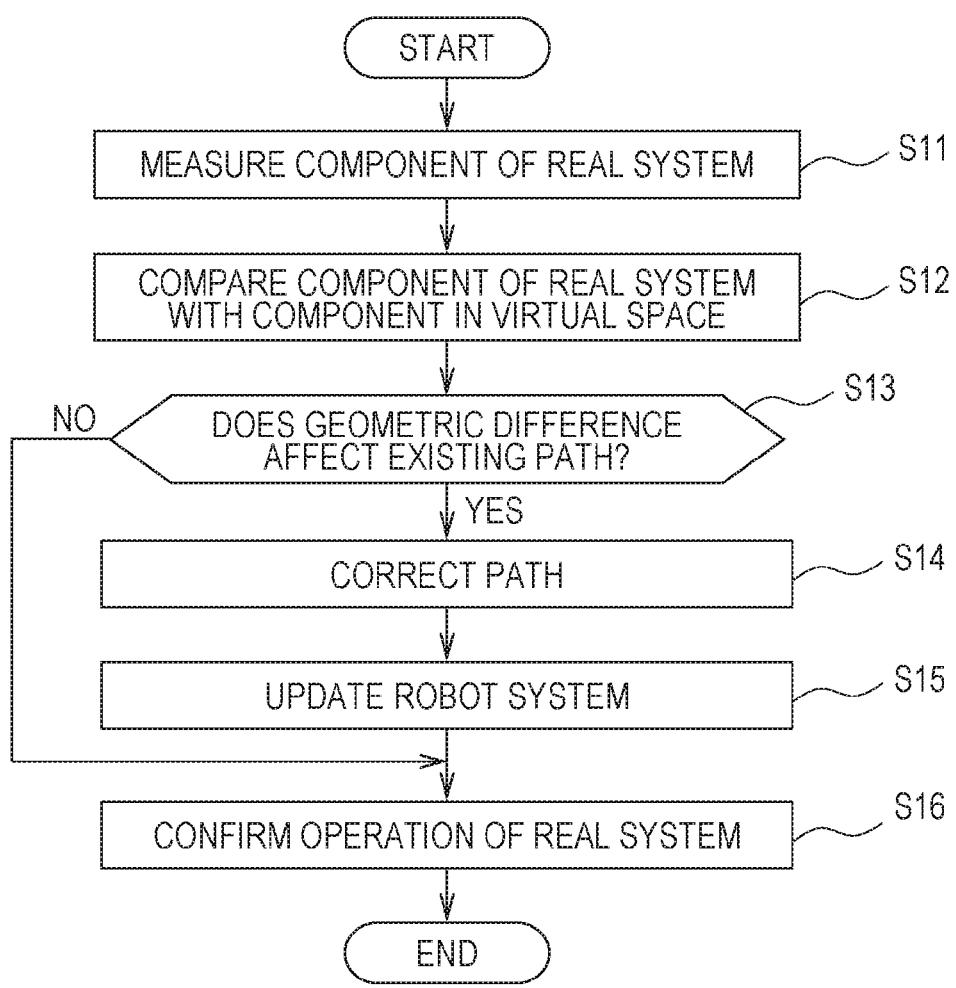

[Fig. 8]
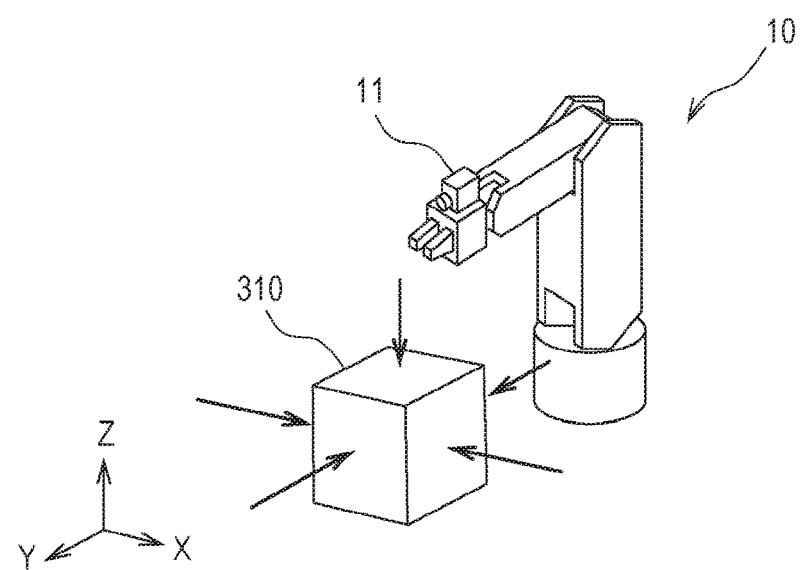
[Fig. 9A]
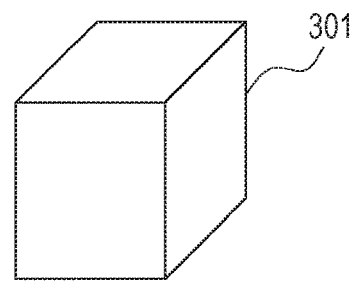

[Fig. 9B]
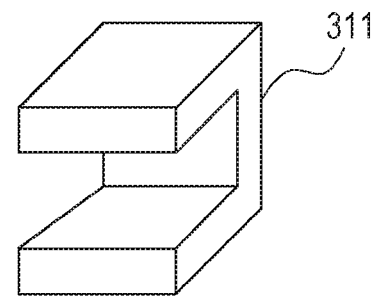
[Fig. 9C]
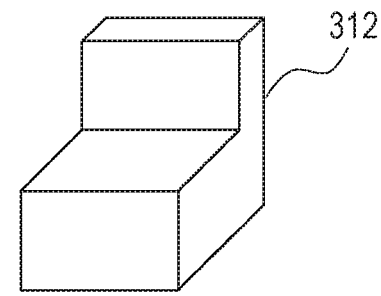
[Fig. 9D]
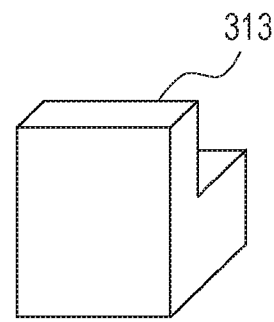

[Fig. 10A]
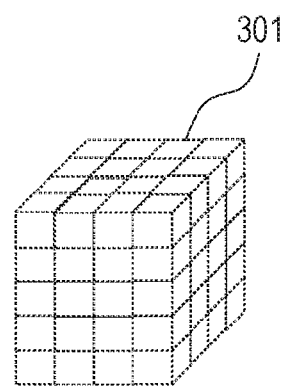
[Fig. 10B]
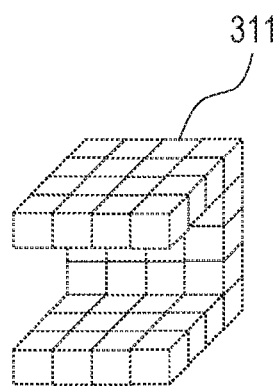

[Fig. 11]
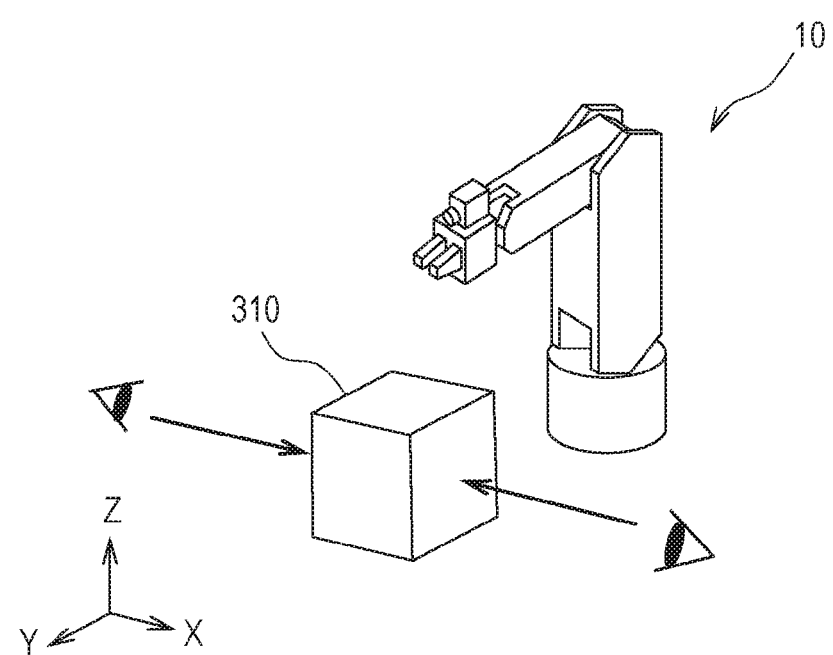

[Fig. 12]
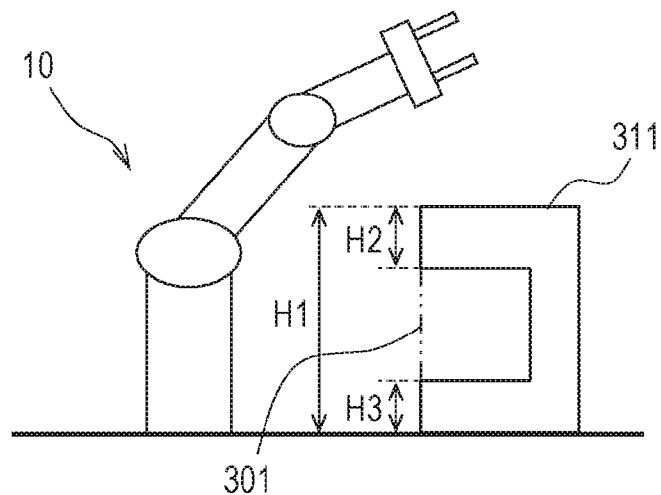
[Fig. 13]
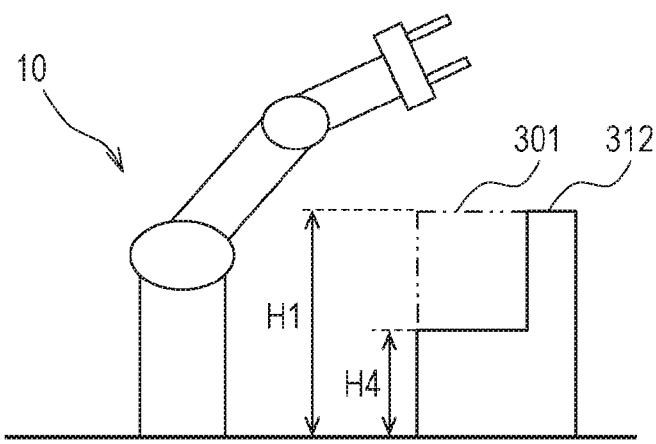

[Fig. 14]
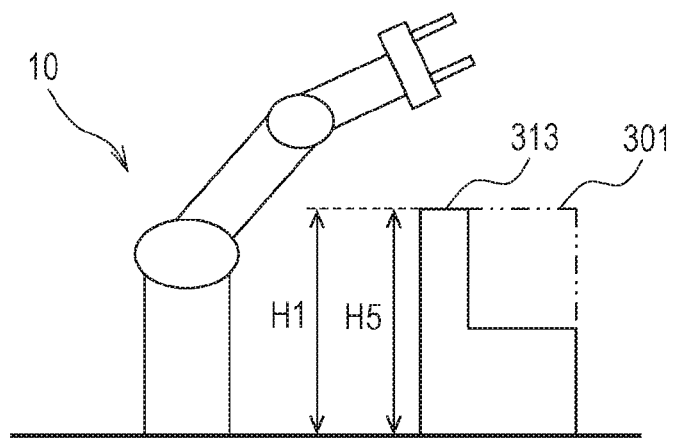
[Fig. 15]
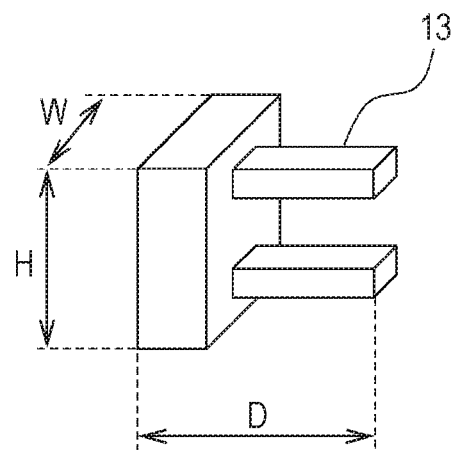

[Fig. 16]
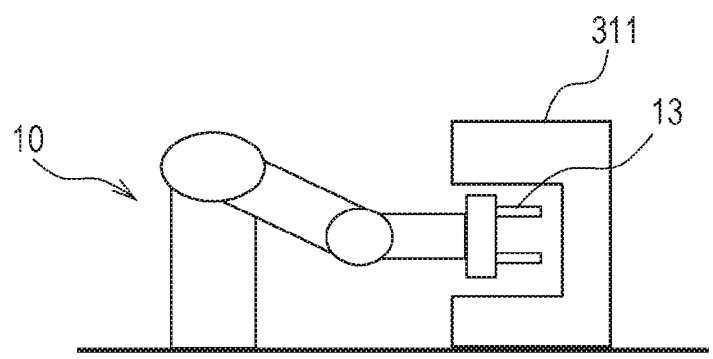
[Fig. 17]
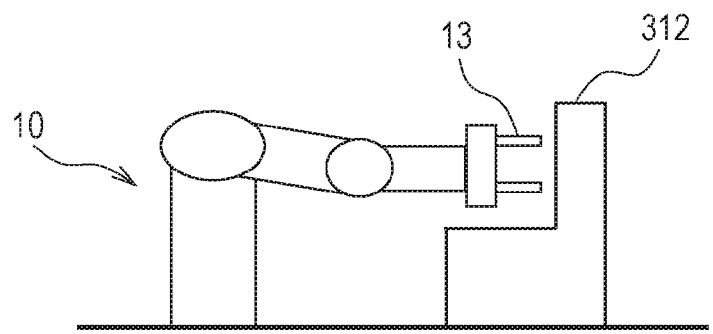

[Fig. 18]
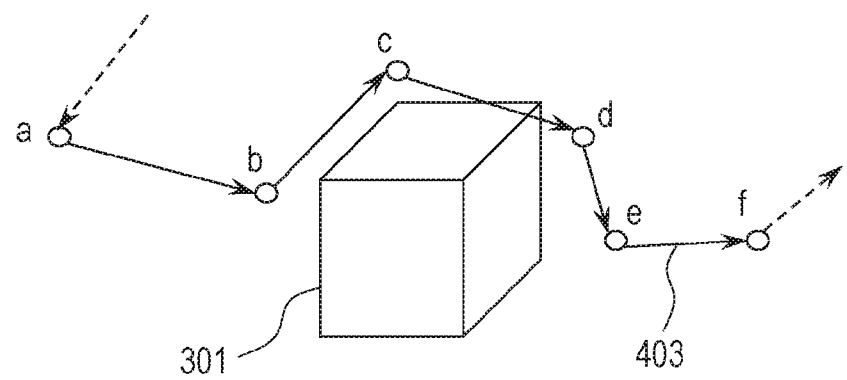
[Fig. 19]
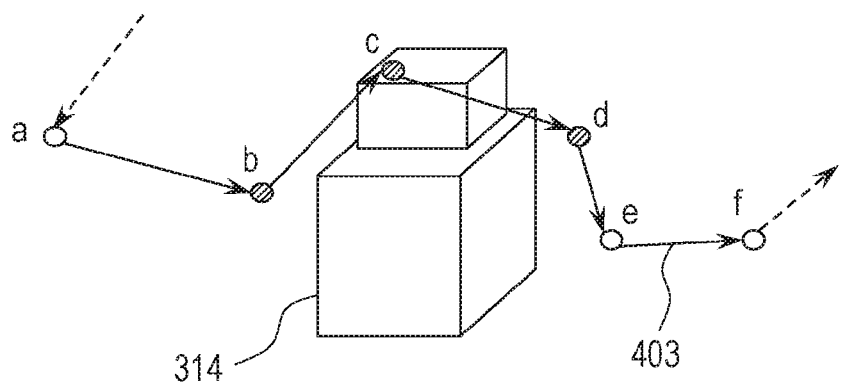

[Fig. 20]
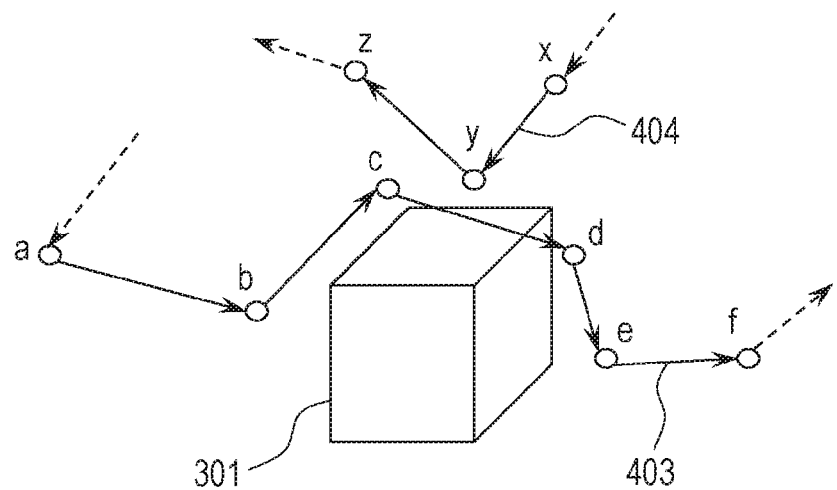
[Fig. 21]
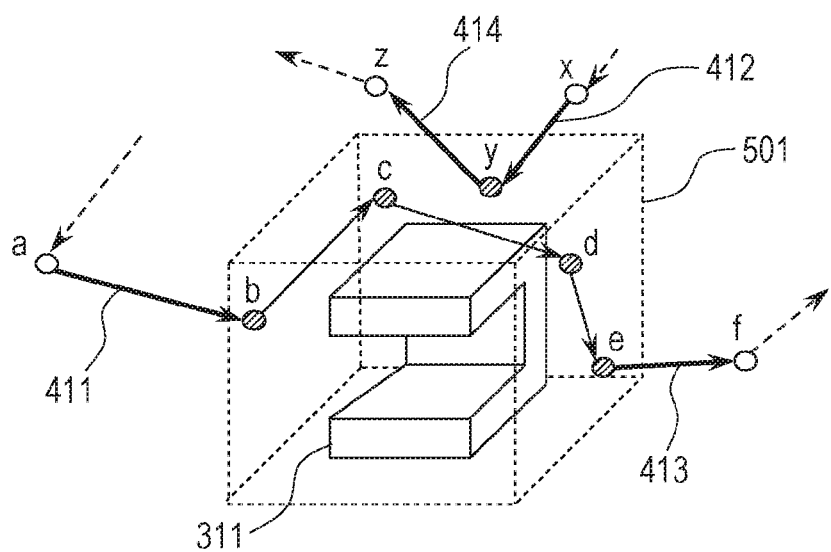

[Fig. 22]
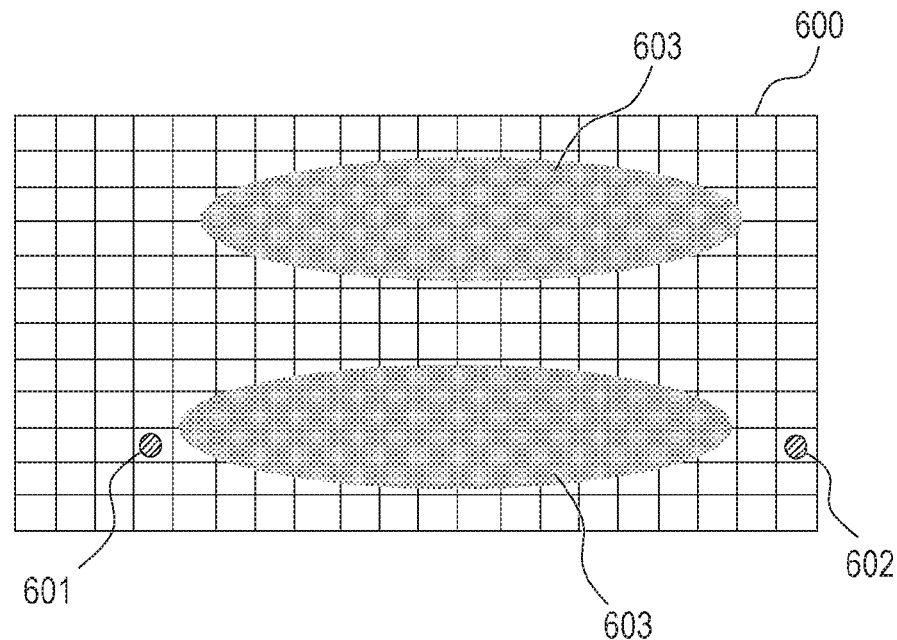
[Fig. 23]
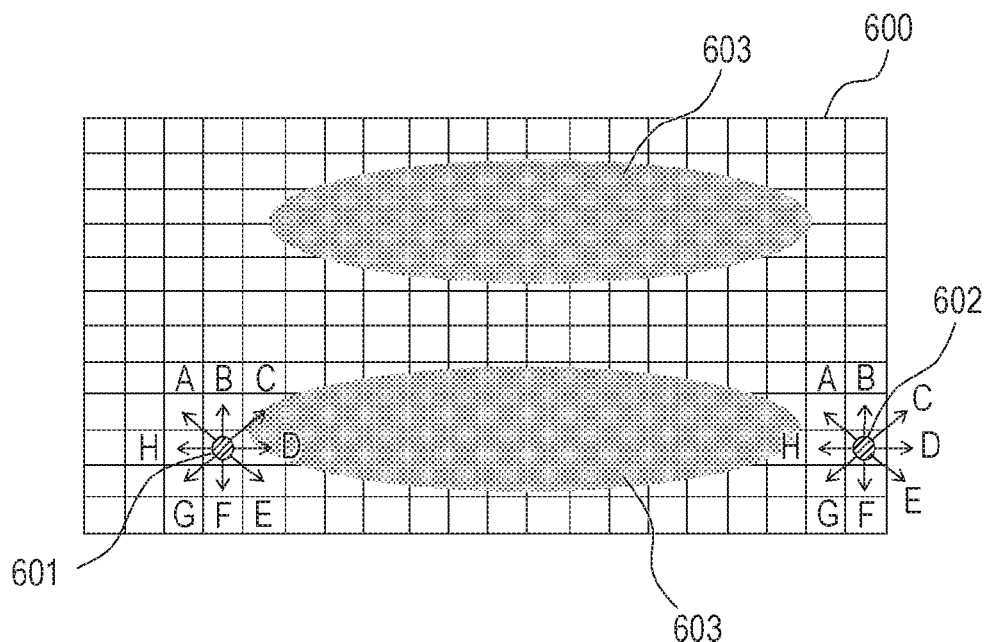

[Fig. 24]
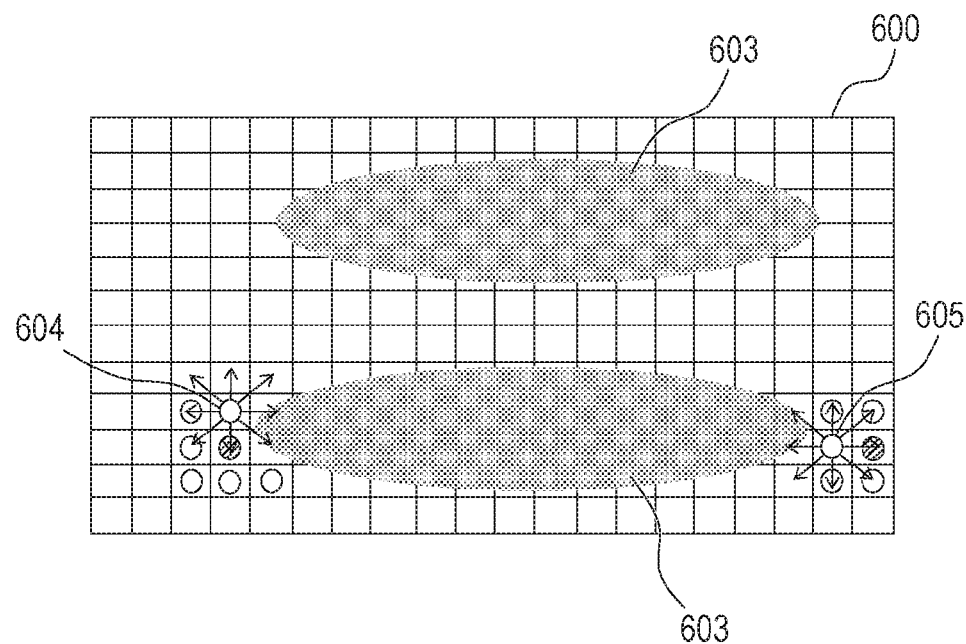
[Fig. 25]
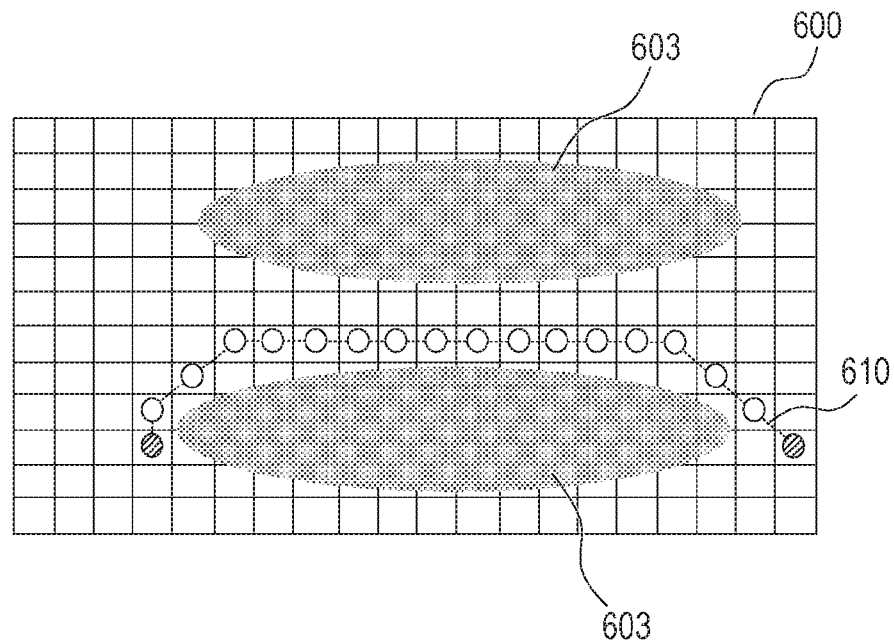

[Fig. 26]
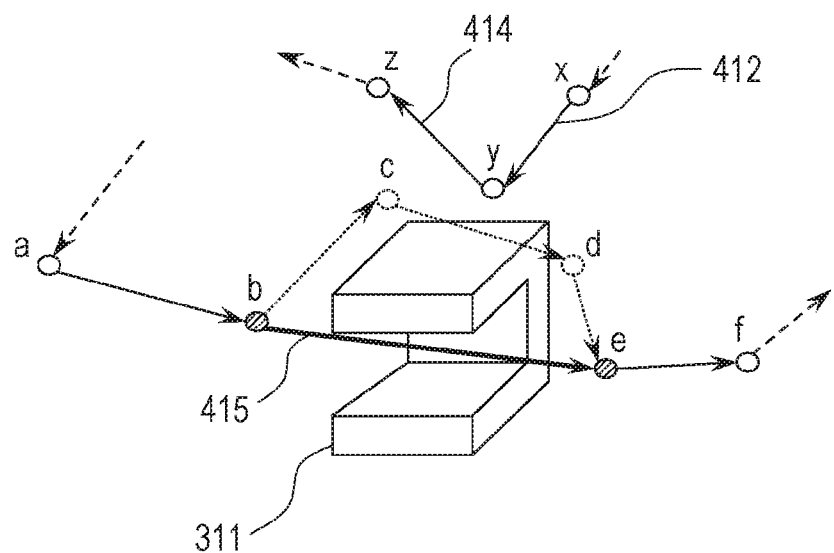
[Fig. 27]
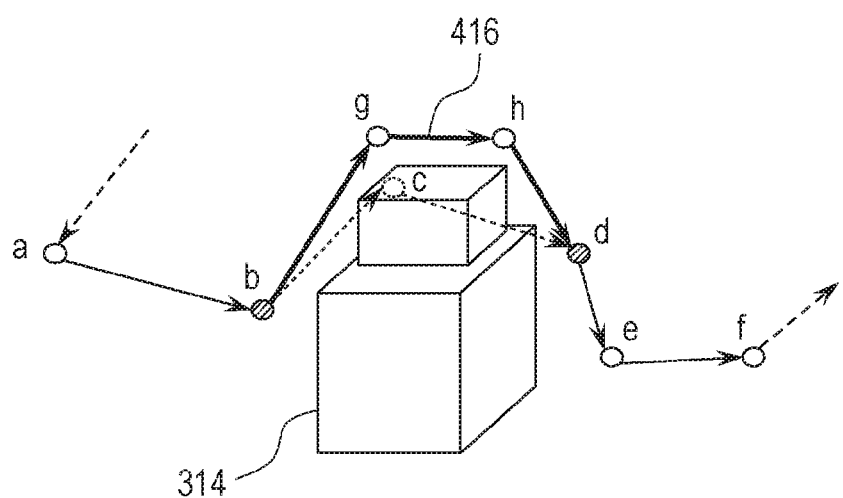

TEACHING DEVICE, TEACHING METHOD, AND ROBOT SYSTEM

TECHNICAL FIELD

The present invention relates to a teaching device which teaches operations of a robot off-line, a teaching method, and a robot system.

BACKGROUND ART

A teaching device constructs a virtual robot system constituted by a robot and a peripheral structure of the robot in a virtual space, generates an operation program of the robot and teaches the operation of the robot off-line. An error usually exists between a virtual robot system and a real robot system and, if an operation program of a robot generated by a teaching device is supplied to a real robot system, it is possible that an interference or the like occurs between the robot and the peripheral structure.

PTL 1 discloses a technique as a teaching device in consideration of the error described above. This technique is for avoiding an interference between a robot and a peripheral structure by detecting an error in disposed position between a structure of a real robot system and a virtual robot system by measuring the disposed position of the structure of the real robot system using a 2D visual sensor, a 3D visual sensor, a distance sensor, and the like, and shifting teaching point coordinates by the amount of the error.

CITATION LIST

Patent Literature

PTL 1: Japanese Patent Laid-Open No. 2003-150219

SUMMARY OF INVENTION

Technical Problem

In a teaching device, 3D models of a robot or a peripheral structure are prepared and disposed in a virtual space to construct a virtual robot system. A teaching work is conducted by setting operations of the robot and teaching point coordinates using these 3D models. During construction of the virtual robot system, the 3D model prepared by a manufacturer of the robot may be used for the robot, whereas no 3D model is prepared for the peripheral structure in many cases. In this case, the 3D model of the peripheral structure is substituted by a simple geometric model having a substantially the same outer dimension. Therefore a difference may occur in model geometry of a structure between the virtual robot system and the real robot system.

The technique disclosed in PTL 1 merely corrects errors in disposed positions of the virtual robot system and the real robot system, and is not able to correct an error in model geometry of the structure. Therefore, in the technique disclosed in PTL 1, it is possible that interference between the robot and the structure occurs in the real robot system due to a difference in a model geometry. The shortest path to a working point may be changed if a difference exists in a model geometry. In the shifting of the teaching point coordinates by the amount of the errors regarding the disposed positions as in the technique disclosed in PTL 1, a moving path of the robot cannot be corrected to the shortest path.

Solution to Problem

Then, the present invention generates appropriate off-line teaching data even if a geometric difference occurs between a structure of a virtual robot system and a structure of a real robot system.

According to an aspect of the present invention, a teaching device which constructs, in a virtual space, a virtual robot system in which a virtual 3D model of a robot and a virtual 3D model of a peripheral structure of the robot are arranged, and teaches a moving path of the robot, the device includes: an acquisition unit configured to acquire information about a geometric error between the virtual 3D models; and a correction unit configured to correct the moving path of the robot in accordance with the information acquired by the acquisition unit. According to the present invention, appropriate off-line teaching data can be generated even if a geometric difference occurs between a structure of a virtual robot system and a structure of a real robot system.

Further features of the present invention will become apparent from the following description of exemplary embodiments with reference to the attached drawings.

BRIEF DESCRIPTION OF DRAWINGS

FIG. 1 is a configuration diagram illustrating an exemplary robot system of the present embodiment.

FIG. 2 is a diagram illustrating an exemplary hardware configuration of a teaching device.

FIG. 3 is a flowchart illustrating an exemplary procedure of a previous analysis process.

FIG. 4 is a diagram illustrating details of a system construction unit.

FIG. 5 is a diagram illustrating details of screen configuration element data.

FIG. 6 is a diagram illustrating exemplary teaching points and an exemplary moving path.

FIG. 7 is a flowchart illustrating an exemplary procedure of a path correction process.

FIG. 8 is a diagram illustrating a method for measuring a component.

FIG. 9A is a diagram illustrating an exemplary geometric difference pattern of a 3D model.

FIG. 9B is a diagram illustrating an exemplary geometric difference pattern of a 3D model.

FIG. 9C is a diagram illustrating an exemplary geometric difference pattern of a 3D model.

FIG. 9D is a diagram illustrating an exemplary geometric difference pattern of a 3D model.

FIG. 10A is a diagram illustrating a method for comparing models.

FIG. 10B is a diagram illustrating a method for comparing models.

FIG. 11 is a diagram illustrating a path correction determination method (shortest path correction).

FIG. 12 is a diagram illustrating exemplary shortest path correction determination.

FIG. 13 is a diagram illustrating exemplary shortest path correction determination.

FIG. 14 is a diagram illustrating exemplary shortest path correction determination.

FIG. 15 is a diagram illustrating an exemplary shape of an end effector.

FIG. 16 is a diagram illustrating an example in which shortest path correction is to be conducted.

FIG. 17 is a diagram illustrating an example in which shortest path correction is to be conducted.

FIG. 18 is a diagram illustrating a path correction determination method (interference avoidance path correction).

FIG. 19 is a diagram illustrating an example in which interference avoidance path correction is to be conducted.

FIG. 20 is a diagram illustrating a shortest path correction method.

FIG. 21 is a diagram illustrating a method for setting a start point and an end point of shortest path correction.

FIG. 22 is a diagram illustrating a path searching method.

FIG. 23 is a diagram illustrating a path searching method.

FIG. 24 is a diagram illustrating a path searching method.

FIG. 25 is a diagram illustrating a path searching method.

FIG. 26 is a diagram illustrating a result of shortest path correction.

FIG. 27 is a diagram illustrating a result of interference avoidance path correction.

DESCRIPTION OF EMBODIMENTS

Hereinafter, embodiments for implementing the present invention are described with reference to the accompanying drawings. The embodiments described below are exemplary implementation of the present invention and should be suitably modified or changed depending on configurations and various conditions of the apparatus to which the present invention is applied. The present invention is not limited to the following embodiments.

First Embodiment

FIG. 1 is a diagram illustrating an exemplary configuration of a robot system 100 provided with a teaching device in the present embodiment. The robot system 100 includes a robot 10 and a teaching device 20. The robot 10 is, for example, an articulated robot, and has a sensor portion 11 attached to an end portion (a hand) of an arm. The sensor portion 11 measures an object located near the hand of the robot 10, and outputs a measurement result to the teaching device 20. The sensor portion 11 may be, for example, a visual sensor or a distance sensor.

The sensor portion 11 does not necessarily have to be mounted on the robot 10, but may be, for example, mounted on another operating machine, or fixed at a position above a predetermined space to be photographed. The robot 10 includes a position and attitude changing mechanism 12 capable of changing the position and attitude of the hand of the robot 10. The position and attitude changing mechanism 12 changes the position and posture of the hand of the robot 10 by changing an angle of each joint of the robot 10. The position and attitude changing mechanism 12 may be driven by an electric motor, or may be driven by an actuator operated by fluid pressure, such as oil pressure and air pressure. The position and attitude changing mechanism 12 is driven in accordance with teaching data indicating a moving path and the like of the robot 10 generated by the teaching device 20.

An end effector 13 is attached to the hand of the robot 10. The end effector 13 is a tool to carry out operations in accordance with types of works of the robot 10 and is, for example, a robot hand. The robot hand may be, for example, a hand having a motor-driving chuck mechanism capable of grasping an object, or a hand employing an adsorption pad which adsorbs an object with air pressure. The end effector 13 is detachably attached to the arm, and is replaceable depending on the type of the work. The robot 10 is not limited to an articulated robot, but may be a numerically controllable (NC) movable machine.

The teaching device 20 generates teaching data for the robot (e.g., a moving path of the robot) in a virtual space, and conducts an off-line teaching (off-line teaching) to supply the real robot with the generated teaching data. Specifically, the teaching device 20 executes a previous analysis process in which 3D models of a virtual robot, a tool attached to the virtual robot (the end effector), a work which is a work object, peripheral structures, and the like, are disposed in the virtual space to construct a virtual robot system, and teaching data is generated by the virtual robot system. The teaching device 20 executes a path correction process to correct the teaching data generated in the previous analysis process in accordance with the geometry of the 3D model of the component acquired after the construction of the real robot system.

Hereinafter, each part of the teaching device 20 is described in detail. The teaching device 20 is, for example, configured by a personal computer (PC) and, as illustrated in FIG. 1, includes a system construction unit 201, a robot path generation unit 202, an operation confirmation unit 203, a measurement and model generation unit 204, a geometric difference determination unit 205, a path correction unit 206, an external I/F unit 207, and an I/O control unit 208. The system construction unit 201 constructs a virtual robot system in a virtual space. The robot path generation unit 202 is a virtual robot system constructed by the system construction unit 201, and generates a moving path of the robot as teaching data. The operation confirmation unit 203 conducts simulation of the robot path generated by the robot path generation unit 202 by animation.

The measurement and model generation unit 204 measures information indicating the geometry of the component of the real robot system by controlling the sensor portion 11, and generates a 3D model (a measured 3D model) of the measured component. The geometric difference determination unit 205 determines whether a geometric difference exists between the measured 3D model generated by the measurement and model generation unit 204 and an existing 3D model (a virtual 3D model) which exists in the virtual space corresponding to the measured 3D model, and acquires information about a geometric error of the existing 3D model. If it is determined that the difference exists, the geometric difference determination unit 205 determines whether the difference may affect the robot path generated in the previous analysis process, i.e., whether the robot path generated in the previous analysis process needs to be corrected.

The path correction unit 206 corrects the robot path generated in the previous analysis process in accordance with the determination result of the geometric difference determination unit 205. If it is determined that the geometric difference may affect the robot path (i.e., the robot path needs to be corrected), the geometric difference determination unit 205 corrects the robot path. The external I/F unit 207 transmits teaching data generated by the robot path generation unit 202 and the path correction unit 206 to the robot 10. The external I/F unit 207 receives the measurement result of the sensor portion 11, and transmits the received measurement result to the measurement and model generation unit 204. The I/O control unit 208 is a device in which a user inputs operations performed via a monitor using pointing devices, such as a keyboard and a mouse, or simulation results are displayed on the monitor.

Hardware Configuration of Off-Line Teaching Device 20

FIG. 2 illustrates an exemplary hardware configuration of the teaching device 20. The teaching device 20 includes a CPU 21, ROM 22, RAM 23, external memory 24, an input unit 25, a display unit 26, a communication I/F 27, and a system bus 28. The CPU 21 controls operations in the teaching device 20 collectively, and controls each of the construction units (22 to 27) via the system bus 28. The ROM 22 is non-volatile memory in which control programs and the like that the CPU 21 requires to execute processes are stored. The programs may be stored in the external memory 24 or a removable storage medium (not illustrated). The RAM 23 functions as main memory, a work area, or the like of the CPU 21. The CPU 21 loads necessary programs or the like from the ROM 22 to the RAM 23 for the execution of processes, and executes the programs and the like to implement various kinds of functional operations.

The external memory 24 stores various types of data, various types of information, and the like that the CPU 21 requires to perform processes using the programs. Various types of data, various types of information, and the like obtained when the CPU 21 performs the processes using the programs are also stored in the external memory 24. The input unit 25 is constituted by a keyboard, a mouse, and the like. An operator is capable of providing instructions to the teaching device 20 via the input unit 25. The display unit 26 is formed by a monitor of, for example, liquid crystal display (LCD). The communication I/F 27 is an interface for communicating with an external device. The system bus 28 connects the CPU 21, the ROM 22, the RAM 23, the external memory 24, the input unit 25, the display unit 26, and the communication I/F 27 to communicate with one another.

The function of each part of the teaching device 20 is implemented when the CPU 21 executes the program stored in the ROM 22 or in the external memory 24. The processes executed by the teaching device 20 are described in detail below.

Previous Analysis Process

FIG. 3 is a flowchart illustrating the previous analysis procedure executed by the teaching device 20. The previous analysis process is a process for conducting previous analysis by simulation in the virtual space before constructing the real robot system. In step S1, the teaching device 20 constructs the virtual robot system in the virtual space. The system construction unit 201 constructs the virtual robot system. The system construction unit 201 imports a 3D model of each component of the robot system and disposes the 3D model in the virtual space to construct the virtual robot system. As illustrated in FIG. 4, regarding a structure in which the 3D model is prepared in an external CAD device 210, the 3D model is imported from the CAD device 210, and regarding a structure in which the 3D model is not prepared in the CAD device 210, a user imports a simple 3D model generated on a screen via the I/O control unit 208. The CAD device 210 may be mounted on the teaching device 20.

When importing the 3D model, the system construction unit 201 stores the screen configuration element data 211 in memory and the like. The screen configuration element data 211 is constituted by the fields illustrated in FIG. 5. Namely, a name 211a of the 3D model, coordinates 211b at which the 3D model is disposed, information 211c about the geometry of the 3D model, a CAD 211d of a reference destination of the 3D model, and a geometric correction implementation flag 211e are correlated to each of the components.

If no 3D model exists in the CAD device 210 and the 3D model generated by the user is imported, nothing is described in the field of the CAD 211d of the reference destination. The geometric correction implementation flag 211e is a flag indicating whether it is possible that a geometric difference has occurred between the virtual system and the real system, and is equivalent to attribution information indicating reliability of the model geometry. In the field of the geometric correction implementation flag 211e, for example, a flag is described indicating that no 3D model exists in the CAD device 210 and that it is possible that a geometric difference has occurred between the structure of the simple geometric model generated and imported by the user and the real robot system. The geometric correction implementation flag 211e is used to determine whether path correction is necessary in a later-described path correction process. Returning to FIG. 3, after constructing the virtual robot system in step S1, the teaching device 20 generates teaching points of the robot and a moving path of the robot obtained by linear interpolation of these teaching points in step S2. The teaching points and the robot path are generated so that working hour becomes shorter and so that the robot path does not interfere with peripheral equipment.

Next, in step S3, a simulation is conducted in the virtual space based on the teaching points and the path generated in step S2. FIG. 6 illustrates an exemplary obtained robot path obtained by a simulation result. Points 401 are teaching points. A robot path 402 is a line connecting the teaching points in the order of a, b, c, d, e, and f. In this manner, the teaching points 401 and the robot path 402 are generated so as not to interfere with peripheral equipment 301. In FIG. 3, the process of step S1 is executed by the system construction unit 201 as described above, the process of step S2 is executed by the robot path generation unit 202, and the process of step S3 is executed by the operation confirmation unit 203.

Path Correction Process

Next, the path correction process executed by the teaching device 20 is described in detail. FIG. 7 is a flowchart illustrating a procedure of the path correction process. The path correction process is a process for correcting the robot path generated in the previous analysis process described above as needed, and is executed after the previous analysis process is executed and the real robot system is constructed. In step S11, the teaching device 20 measures components of the real robot system at the sensor portion 11. The components to be measured are determined based on the screen configuration element data 211 generated during the construction of the virtual robot system.

First, the teaching device 20 refers to the field of the geometric correction implementation flag 211e of the screen configuration element data 211 illustrated in FIG. 5 and discriminates a component at which a geometric difference with the real robot system may occur. Next, the teaching device 20 refers to the field of the arrangement 211b of the screen configuration element data 211 illustrated in FIG. 5, and acquires a position in the virtual space of the component at which the geometric difference may occur. In this manner, the component to be measured with the sensor by the real robot system is determined.

If the component is measured by the sensor portion 11, the component to be measured is measured from a plurality of directions to an extent that a 3D model may be generated. The direction to measure is determined based, for example, on the field information of the geometry 211c of the component as illustrated in FIG. 8 from any one of the X direction (i.e., the width direction of the structure 310), the Y direction (the depth direction of the structure 310), and the Z direction (the height direction of the structure 310). When the component to be measured is thus determined, the teaching device 20 outputs a measurement instruction to the sensor portion 11 via the external I/F unit 207, and acquires a measurement result of the sensor portion 11. The teaching device 20 generates a 3D model (a measured 3D model) of the component based on the acquired measurement result, and proceeds the process to step S12.

In step S12, the teaching device 20 compares the measured 3D model generated in step S11 with an existing 3D model in the virtual space corresponding to the measured 3D model. If the existing 3D model is a simple geometric model having the same outer dimension as that of the actual component like a 3D model 301 illustrated in FIG. 9A, there is a case where the measured 3D model is substantially the same in outer dimension as the existing 3D model 301 but different in shape with the existing 3D model 301 (like 3D models 311 to 313 illustrated in FIGS. 9B to 9D, respectively). Then, as illustrated, for example, in FIGS. 10A and 10B, the existing 3D model 301 and the measured 3D model 311 are illustrated in voxels and compared in shape. A geometric difference between the existing 3D model 301 and the measured 3D model 311 is confirmed by, for example, extracting the Fourier spectrum of the shape illustrated in voxels.

Next, in step S13, the teaching device 20 determines whether the geometric difference may affect the robot path generated in the previous analysis process based on the information about the component determined to have the geometric difference in step S12. Here, if the robot path generated in the previous analysis process is correctable to the shortest path with a shorter working hour due to the geometric difference, it is determined that the geometric difference affects the robot path. Since an interference occurs between the robot path generated in the previous analysis process and the real component, it is determined that the geometric difference may affect the robot path also when the robot path needs to be corrected to a path to avoid the interference.

First, a method for determining whether correction to the shortest path is possible is described. As illustrated in FIG. 11, the robot 10 and the 3D model 310 of the real structure are seen from both sides in the X direction. The size of the existing 3D model in the height direction (the Z direction) on the surface facing the robot 10, the size of the measured 3D model in the height direction (the Z direction) on the surface facing the robot 10, and the sizes of the end effector 13 of the robot 10 in the height direction (the Z direction) and in the depth direction (the Y direction) are focused on. For example, if the measured 3D model is the 3D model 311 illustrated in FIG. 9B, as illustrated in FIG. 12, the size H1 is focused on regarding the existing 3D model 301. The sizes H2 and H3 are focused on regarding the measured 3D model 311.

If the measured 3D model is the 3D model 312 illustrated in FIG. 9C, as illustrated in FIG. 13, the size H1 is focused on regarding the existing 3D model 301 in the same manner as in FIG. 12. The size H4 is focused on regarding the measured 3D model 312. Similarly, if the measured 3D model is the 3D model 313 illustrated in FIG. 9D, as illustrated in FIG. 14, the size H1 is focused on regarding the existing 3D model 301. The size H5 (=H1) is focused on regarding the measured 3D model 313.

Then, based on the sizes focused on described above, it is determined whether the geometric difference between the existing 3D model and the measured 3D model may affect the robot path generated in the previous analysis process. In the present embodiment, in a case where the end effector 13 of the robot 10 has the height H, the width W, and the depth D as illustrated in FIG. 15, if the value obtained by subtracting the sum total of the size of the measured 3D model in the height direction on the surface facing the robot 10 from the size of the existing 3D model in the height direction on the surface facing the robot 10 is greater than the height H or the width W of the end effector 13, it is determined that the geometric difference may affect the robot path. In an example illustrated in FIG. 12, when H1−(H2+H3)>H or H1−(H2+H3)>D, as illustrated in FIG. 16, it is possible that the end effector 13 of the robot 10 passes through a hollowed portion which is the difference portion with the existing 3D model 301. Therefore, it is determined that the shortest path may be found newly and, in this case, it is determined that the existing robot path may be affected.

In the case of example illustrated, for example in FIG. 13, when H1−H4>H or H1−H4>D, as illustrated in FIG. 17, it is possible that the end effector 13 of the robot 10 passes through a hollowed portion which is the difference portion with the existing 3D model 301. Also in this case, it is determined that the existing robot path may be affected (correction to the shortest path is possible). On the contrary, in the example illustrated in FIG. 14 in which H1−H5=0 and the condition described above is not satisfied, it is determined that the existing robot path is not affected (correction to the shortest path is impossible). Whether correction to the shortest path is possible can thus be determined. This determination is made regarding both sides in the X direction of FIG. 11.

Next, a method for determining whether correction to the interference avoidance path is necessary is described. FIG. 18 is a diagram illustrating an exemplary robot path generated in the previous analysis process. This robot path 403 is a path along which the robot 10 passes near the existing 3D model 301 in the order of the teaching points of a, b, c, d, e, and f in the virtual space. Whether correction to the interference avoidance path is necessary is determined based on the positional relationship between the existing robot path 403 and the measured 3D model 314 after displacing the existing 3D model 301 in FIG. 18 with the measured 3D model 314 as illustrated in FIG. 19.

In the example illustrated in FIG. 19, it turns out that an interference occurs on the path passing through the teaching points b, c, and d due to the geometric difference. That is, the path passing through the teaching points b, c, and d is a path requiring correction to the interference avoidance path. Whether correction to the interference avoidance path is possible can thus be determined. If it is determined that the geometric difference may affect the existing robot path in step S13 of FIG. 7, the teaching device 20 determines to correct the robot path and proceeds the process to step S14. If it is determined that the existing robot path is not affected, the teaching device 20 determines not to correct the robot path and proceeds the process to later-described step S16. In step S14, the teaching device 20 corrects the robot path. Here, the teaching device 20 partially corrects the robot path generated in the previous analysis process at the portion requiring the correction.

First, a method for correcting to the shortest path is described. FIG. 20 is a diagram illustrating an exemplary robot path generated in the previous analysis process. The robot path 403 is a path along which the robot 10 passes near the existing 3D model 301 in the order of the teaching points a, b, c, d, e, and f in the virtual space. The robot path 404 is a path along which the robot 10 passes near the existing 3D model 301 in the order of the teaching points x, y, and z in the virtual space. When searching for the shortest path, as illustrated in FIG. 21, the existing 3D model 301 in FIG. 20 is first replaced with the measured 3D model 311.

Next, a vicinity area 501 located at a certain distance from the measured 3D model 311 is set, and the teaching points located in the vicinity area 501 are searched. In the example illustrated in FIG. 21, the teaching point b, c, d, e, and y are located in the vicinity area 501. Although the vicinity area 501 is a rectangular parallelepiped space herein, it is only necessary that the vicinity area 501 defines a region near the measured 3D model, and may be, for example, spherical in shape. Further, a path toward the teaching points in the vicinity area 501 (i.e., a path entering the vicinity area 501 from the outside of the vicinity area 501) is searched from the outside of the vicinity area 501. In the example illustrated in FIG. 21, a path 411 of a to b and a path 412 of x to y are searched. Similarly, a path toward outside the vicinity area 501 from the inside of the vicinity area 501 is searched. In the example illustrated in FIG. 21, a path 413 of e to f and a path 414 of y to z are searched.

Next, teaching points of which end point of the path entering the vicinity area 501 from the outside of the vicinity area 501 (the path 411 and the path 412 in FIG. 21) and the start point of the path moving out of the vicinity area 501 from the vicinity area 501 (the path 413 and the path 414 in FIG. 21) are not the same coordinates are searched. In example illustrated in FIG. 21, the teaching point b and the teaching point e are searched. In FIG. 21, regarding the path in the order of the teaching points x, y, and z, the teaching point y has both the functions of the start point and the end point, and it can be determined that the end effector 13 enters the vicinity area 501 just for a moment and it has no relationship with the end effector passing through the hollowed portion of the 3D model 311. Therefore, it turns out that it is only necessary to search the shortest path with the teaching point b as the start point and with the teaching point e as the end point.

A search tree method may be used, for example, for the shortest path search. FIG. 22 is a diagram illustrating a method for searching a path by graph searching. A case where the shortest path from a start point 601 to a target point 602 in a space 600 is to be searched as illustrated in FIG. 22 is considered. Here, obstacles, i.e., non-transmitting areas 603 exist in the space 600. Although a 2D space is illustrated in FIG. 22, the present embodiment is applicable also to a 3D space.

First, the space 600 is rendered as mesh (grid) structures as illustrated in FIG. 22. Next, as illustrated in FIG. 23, moving from the start point 601 to an adjoining grid and moving from the target point 602 to an adjoining grid are considered. If the obstacles 603 exist in the adjoining grids, the points do not move to those grids. For example, regarding the start point 601 in FIG. 23, since the obstacle 603 exists in the directions of C and D among the eight directions of A to H, the start point 601 does not move to the directions of C and D. Regarding the target point 602, since no obstacle 603 exists in any adjoining grids, the target point 602 can move to any directions of A to H.

Similarly, as illustrated in FIG. 24, the path moves to adjoining grids in which no obstacle exists (e.g., grids 604 and 605) from the grid to which they have moved. This process repeated at both the start point 601 and the target point 602, and the path along which the points from the start point 601 and the target point 602 enter the same grid most promptly is the shortest path. In this example, the path 610 is the shortest path as illustrated in FIG. 25. The shortest path searched in the method described above with the teaching point b in FIG. 21 as the start point and teaching point e in FIG. 21 as the end point is the path 415 in FIG. 26. The existing robot path can thus be corrected to the shortest path.

Since the method described above is used for the path search algorithm, if the vicinity area 501 is set large, the path correction in the long distance becomes possible and the corrected path can be smoothed. In this case, however, it is easily estimated that the process time becomes long. Therefore, the vicinity area 501 may be set depending on whether priority is given to processing time or priority is given to smoothness of the path. Although the case where the shortest path is searched by graph searching has been described above, other algorithms (e.g., sampling base searching, such as RRT and PRM) may also be used.

Next, a method for correcting to the interference avoidance path is described. First, the start point and the end point of the interference avoidance path are searched. In the example illustrated in FIG. 19 described above, the path passing through the teaching points b, c, and d is a path requiring correction to the interference avoidance path. Therefore, in this case, the interference avoidance path is searched with the teaching point b as the start point and the teaching point d as the end point. Search of the interference avoidance path is conducted in the same manner as the search of the shortest path described above. In this manner, as illustrated in FIG. 27, a corrected path 416 of which teaching point b is the start point and teaching point d is the target point, and of which interference with the measured 3D model 314 has been avoided is obtained. The corrected path 416 passes through, for example, the teaching points g and h newly set in the path search. As described above, after the path is corrected to pass the shortest path or to avoid an interference, the teaching device 20 proceeds the process to step S15 of FIG. 7 and updates the virtual robot system. That is, the teaching device 20 replaces the 3D model in the virtual space with the measured 3D model and updates the robot system in the virtual space.

Next, in step S16, the teaching device 20 transmits the corrected robot path data to the real robot system. Operation confirmation by the real robot system is thus conducted. As described above, in the present embodiment, the moving path of the robot taught by the virtual robot system in the virtual space for the previous analysis is corrected depending on the geometric error of the virtual 3D model which configures the virtual robot system. In a case where a geometric difference in the structure of the robot system exists between the virtual robot system and the real robot system, when the robot is made to operate on the operation program generated on the virtual robot system, an interference between the robot and the peripheral equipment may occur in the real robot system, or a desired working hour may be unable to be achieved.

Therefore, in a related art off-line teaching device, a generated operation program is transmitted to the real robot system, adjustment is conducted in the real robot system, and the operation program is corrected. If the operation program corrected in the real robot system is returned to the teaching device, an interference or the like may occur between the robot and the peripheral equipment in a simulation on the teaching device. Therefore, the robot system in the virtual space is reconstructed to be the same as the real robot system and re-teaching operation is conducted.

On the contrary, in the present embodiment, if a geometric error of the virtual 3D model has occurred, the operation program generated on the virtual robot system is corrected automatically and then transmitted to the real robot system. Therefore, onsite adjustment or re-teaching operation using the real robot system are unnecessary. Thus, appropriate off-line teaching is achieved even if a geometric difference in structure has occurred between the system in the virtual space and the real robot system. Whether the geometric difference of the 3D model may affect the robot path generated in the previous analysis process, i.e., whether correction of that robot path is necessary is determined and, if it is determined that correction is necessary, the robot path is corrected. Therefore, the correction process may be executed efficiently.

Whether a geometric error of the virtual 3D model has occurred is determined by measuring the shape of the structure of the real robot system using a visual sensor, a distance sensor, and the like. Specifically, a measured 3D model of the structure is generated in accordance with the measurement result of the sensor, the generated measured 3D model and the virtual 3D model are compared, and a geometric error of the virtual 3D model is calculated. Since the geometric difference is determined in accordance with the measurement result, existence of the geometric difference in the structure of the robot system between the virtual robot system and the real robot system can be known reliably.

The geometric measurement by the sensor is conducted only about the structure on the real robot system corresponding to the virtual 3D model in which it is determined that a geometric error may exist. Here, whether a geometric error may exist is determined depending on whether, for example, the virtual 3D model is a simple geometric model generated by the user. The 3D data prepared by a manufacturer of the robot may be used for the robot, whereas no 3D model is prepared, though 2D drawings exist, for the peripheral equipment in many cases since the number of parts, such as tools, is large. Especially, since the peripheral equipment is supplied at a production site, newly generating a 3D model is a significantly time-consuming work to an operator in the production site who does not design using a 3D CAD device. Therefore, regarding the peripheral equipment, a simple geometric model having a substantially the same outer dimension as that of the 3D model is generated and used as a substitution in many cases. Therefore, various types of data different in reliability of model geometry exist in the virtual 3D model constituting the virtual robot system.

In the present embodiment, when constructing the virtual robot system, attribution information (the geometric correction implementation flag $211e$) indicating whether the model is data with high reliability prepared by a manufacturer and the like or the model is data with low reliability generated simply by the user is added to each virtual 3D model. With reference to the attribution information, the virtual 3D model in which a geometric error may exist is discriminated. Therefore, a structure requiring geometric measurement using the sensor can be discriminated relatively easily and appropriately.

In the comparison between the measured 3D model and the virtual 3D model, these 3D models are expressed by voxel data and a geometric difference therebetween is determined. Therefore, geometric comparison can be conducted appropriately. Whether the geometric difference of the 3D model may affect the robot path generated in the previous analysis process, i.e., whether that robot path needs to be corrected, is determined depending on whether the robot path is correctable to the shortest moving path, or whether the robot path is a path along which an interference may occur.

In the previous analysis process, off-line teaching is conducted so that no interference between the robot and the peripheral equipment occurs on the virtual robot system and the working hour becomes the shortest, and the operation program is generated. If, however, there is a geometric difference between the virtual 3D model and the real structure, the shortest path to the working point may be changed (i.e., the shorter path may be found). In the present embodiment, if it is determined that the robot path is correctable to the shortest moving path due to the geometric difference of the 3D model, that robot path is correctable to the shortest moving path. Therefore, the shortest path to the working point can be taught appropriately, and further shortening of the working hour can be achieved.

At this time, whether the robot path is correctable to the shortest moving path is determined depending on the geometry of the virtual 3D model, the geometry of the measured 3D model, and the geometry of the 3D model of the end effector of the robot. Specifically, when the length obtained by subtracting the length of a side of the measured 3D model in the height direction on the surface facing the robot from the length of a side of the virtual 3D model in the height direction on the surface facing the robot is longer than the length corresponding to the 3D model of the end effector in the height direction, it is determined that the robot path is correctable to the shortest moving path. Therefore, if the structure of the real robot system has a hollowed portion and its magnitude is large enough for the end effector to pass through, it is determined that the path along which the end effector passes through the hollowed portion is the shortest moving path, and the robot path can be corrected.

Further, in the present embodiment, if it is determined that the robot path is the path along which an interference may occur in the real robot system due to the geometric difference of the 3D model, that robot path is correctable to an interference avoidance path. Therefore, adjustment after transmitting the operation program to the real robot system becomes unnecessary. At this time, it is determined whether the robot path is a path along which an interference may occur depending on the geometry of the measured 3D model, and the robot path. As described above, whether an interference may occur can be determined easily from the positional relationship between the measured 3D model and the robot path. If the path is corrected to the shortest moving path or the interference avoidance path, the moving path which needs to be corrected near the virtual 3D model is corrected partially of the robot path generated in the previous analysis process. Therefore, correction process time can be shortened.

If the path is corrected to the shortest moving path, the virtual 3D model is replaced by the measured 3D model, and a vicinity area located at a predetermined distance from the measured 3D model is set in the virtual space. Then a start point and an end point of a moving path to be partially corrected are selected from the teaching points which exist in the vicinity area, and the shortest moving path connecting the selected teaching points is searched. The teaching point which becomes an end point of the moving path moving from a teaching point outside of the vicinity area to the teaching point inside of the vicinity area is selected as a start point, and the teaching point which becomes a start point of the moving path moving from a teaching point inside of the vicinity area to the teaching point outside of the vicinity area is selected as an end point. Since the start point and the end point of the moving path to be partially corrected are thus selected and path search is conducted, a path along which the end effector passes through the hollowed portion of the 3D model can be searched. Therefore, a path to move to the working point at the shortest than the robot path generated in the previous analysis process can be searched.

If the path is corrected to the interference avoidance path, the teaching point as the start point and the teaching point as the end point of the moving path along which an interference has occurred are selected as the start point and the end point of the moving path to be partially corrected, respectively, an interference avoidance path connecting the selected teaching points is searched. Therefore, the robot path along which no interference occurs can be taught appropriately in the real robot system. As described above, the robot path taught with the robot system model constructed using the 3D model of the component in the virtual space for the previous analysis can be corrected automatically as necessary depending on the geometry of the 3D model of the component measured after the construction of the real robot system so that the robot passes the shortest path or the robot passes the path avoiding an interference. Therefore, even if a geometric difference occurs between a structure of a virtual robot system and a structure of a real robot system, appropriate off-line teaching data can be generated, and labor and time for re-instruction can be saved.

Modification

The geometry of the periphery structure of the robot 10 is measured using the sensor portion 11 in the embodiment described above, but the geometry of the end effector 13 of the robot 10 may be measured using the sensor portion 11. In this case, measured values can be used as the values of the height H or the width W of the end effector 13 used for the determination as to whether a geometric difference between the existing 3D model and the measured 3D model may affect the robot path generated in the previous analysis process. Therefore, more highly precise determination can be conducted.

In the embodiment described above, the geometry of the structure on the real robot system is measured using the sensor portion 11, and a difference in model geometry is confirmed by comparing the measured 3D model generated in accordance with the measurement result with the existing 3D model, but this is not restrictive. For example, information about a geometric error of the existing 3D model (a geometric difference with a corresponding structure of a real robot system) may be directly input from outside by, for example, a user. In this case, processes of steps S11 and S12 of FIG. 7 become unnecessary.

Other Embodiments

The present invention is applicable also to a process in which a program that performs one or more functions of the above-described embodiments is supplied to a system or an apparatus via a network or a storage medium, and one or more processors in a computer of the system or the apparatus read and execute the program. Further, the present invention is implementable in a circuit having one or more functions (e.g., ASIC).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-019641, filed Feb. 3, 2015, which is hereby incorporated by reference herein in its entirety.

The invention claimed is:

1. A teaching device which constructs, in a virtual space, a virtual robot system in which a virtual 3-dimensional (3D) model of a robot and a peripheral structure of the robot are arranged, and teaches a moving path of the robot, the teaching device comprising:
   one or more processors;
   a non-transitory memory having stored thereon instructions that when executed by the one or more processors, cause the teaching device to:
      acquire information about a geometric error between the virtual 3D model and a geometry of a structure on a real robot system; and
      correct the moving path of the robot in accordance with the information about the geometric error in a case where the moving path of the robot based on teaching data indicating the moving path of the robot can be shortened or in a case where interference with the peripheral structure occurs due to movement of the robot based on the teaching data.

2. The teaching device according to claim 1, wherein the instructions, when executed by the one or more processors, cause the teaching device to:
   determine the necessity of correction of the moving path of the robot in accordance with the information about the geometric error,
   wherein if it is determined that correction is necessary, the teaching device corrects the moving path of the robot.

3. The teaching device according to claim 1, further comprising:
   a measurement unit configured to measure a geometry of a structure on a real robot system corresponding to the virtual robot system,
   wherein the instructions, when executed by the one or more processors, cause the teaching device to:
      generate a measured 3D model of the structure in accordance with a measurement result of the measurement unit; and compare the measured 3D model with the virtual 3D model, and calculate information about a geometric error in the virtual 3D model.

4. The teaching device according to claim 3, wherein the instructions, when executed by the one or more processors, cause the teaching device to:
discriminate the virtual 3D model in which the geometric error may exist,
wherein the measurement unit measures the geometry of the structure on the real robot system corresponding to the virtual 3D model for which it is discriminated that the geometric error may exist.

5. The teaching device according to claim 4, wherein
the virtual 3D model is a 3D model to which attribution information indicating reliability of a model geometry is added, and
the instructions, when executed by the one or more processors, cause the teaching device to:
discriminate whether the geometric error has occurred in accordance with the attribution information added to the virtual 3D model.

6. The teaching device according to claim 3, wherein the instructions, when executed by the one or more processors, cause the teaching device to:
compare voxel data of the measured 3D model with voxel data of the virtual 3D model, and calculates information about the geometric error of the virtual 3D model.

7. The teaching device according to claim 3, wherein the instructions, when executed by the one or more processors, cause the teaching device to:
determine whether the moving path of the robot is correctable to a shorter moving path based on a geometry of the virtual 3D model, a geometry of the measured 3D model, and a geometry of a 3D model of an end effector of the robot.

8. The teaching device according to claim 3, wherein the instructions, when executed by the one or more processors, cause the teaching device to:
determine whether the moving path of the robot is a path along which an interference may occur depending on a geometry of the measured 3D model and the moving path of the robot.

9. The teaching device according to claim 1, wherein the instructions, when executed by the one or more processors, cause the teaching device to:
partially correct the moving path near the virtual 3D model of the moving path of the robot.

10. The teaching device according to claim 9, wherein the instructions, when executed by the one or more processors, cause the teaching device to:
convert the virtual 3D model into the measured 3D model;
set a vicinity area located at a predetermined distance from the measured 3D model in the virtual space when it is determined that the moving path of the robot is correctable to the shorter moving path;

select a start point and an end point of the moving path to be partially corrected among teaching points existing in the vicinity area; and
search the shorter moving path connecting the selected teaching points.

11. The teaching device according to claim 10, wherein the instructions, when executed by the one or more processors, cause the teaching device to:
select, as the start point, a teaching point which becomes an end point of the moving path moving from a teaching point outside of the vicinity area to the teaching point inside of the vicinity area, and select, as the end point, the teaching point which becomes a start point of the moving path moving from a teaching point inside of the vicinity area to the teaching point outside of the vicinity area.

12. The teaching device according to claim 10, wherein the instructions, when executed by the one or more processors, cause the teaching device to:
select a teaching point as a start point and a teaching point as an end point of the moving path along which an interference has occurred are selected as the start point and the end point of the moving path to be partially corrected, respectively, if it is determined that the moving path of the robot is a path along which the interference may occur; and
search an interference avoidance path connecting the selected teaching points.

13. A robot system comprising:
a robot;
the teaching device according to claim 1; and
a controller configured to operate the robot in accordance with a moving path of the robot taught by the teaching device.

14. A non-transitory computer-readable recording medium storing a readable control program configured to cause a computer to function as the teaching device according to claim 1.

15. A teaching method, comprising:
constructing, in a virtual space, a virtual robot system in which a virtual 3D model of a robot and a virtual 3D model of a peripheral structure of the robot are arranged;
acquiring, when teaching the moving path of the robot, information about a geometric error of the virtual 3D models and a geometry of a structure on a real robot system; and
correcting the moving path of the robot in accordance with the acquired information about the geometric error in a case where the moving path of the robot based on teaching data indicating the moving path of the robot can be shortened or in a case where interference with the peripheral structure occurs due to movement of the robot based on the teaching data.

* * * * *